July 2, 1963  J. M. MORRIS  3,095,747
AMPLITUDE CONTROL OF RESONANT VIBRATION EXCITER
Filed July 22, 1957  5 Sheets-Sheet 1
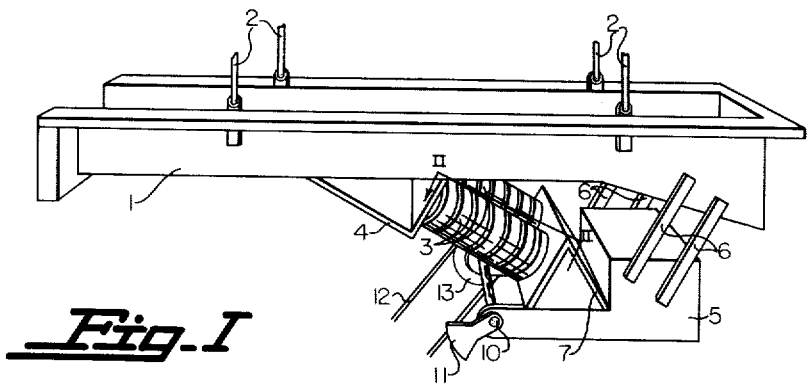
Fig. I
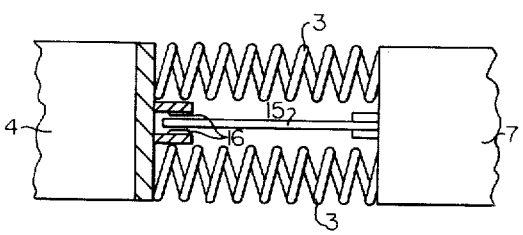
Fig. II
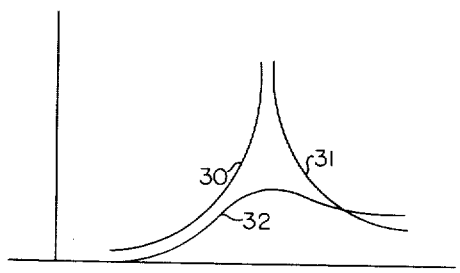
Fig. III
INVENTOR.
JOHN M. MORRIS
BY
Marshall, Marshall & Gersting
ATTORNEYS

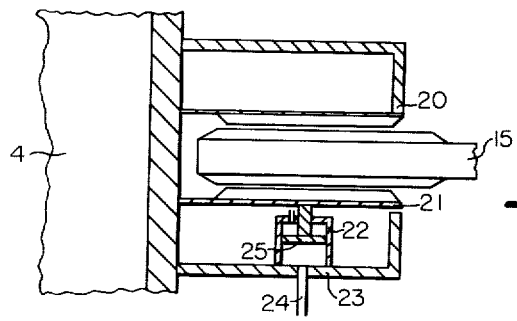
Fig. IV
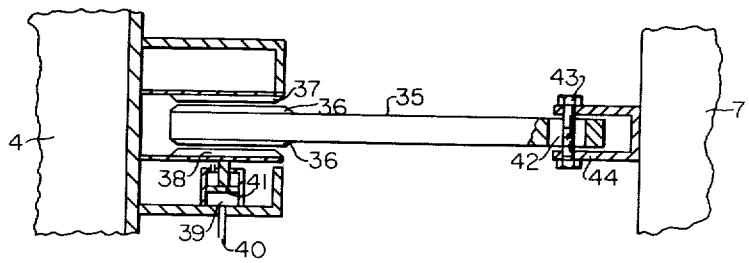
Fig. V
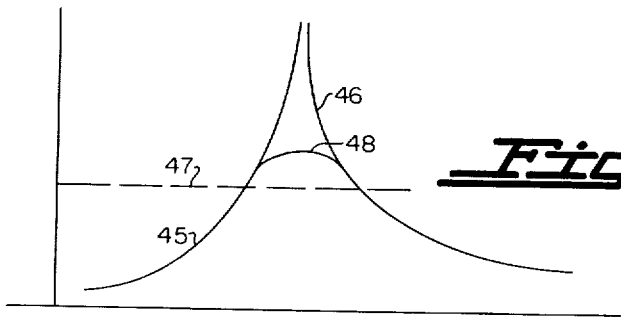
Fig. VI
INVENTOR.
JOHN M. MORRIS

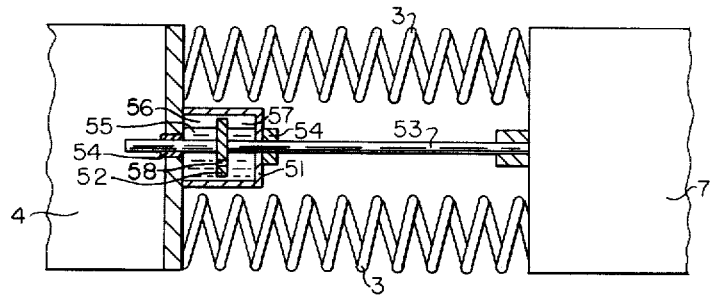
_Fig. VII_
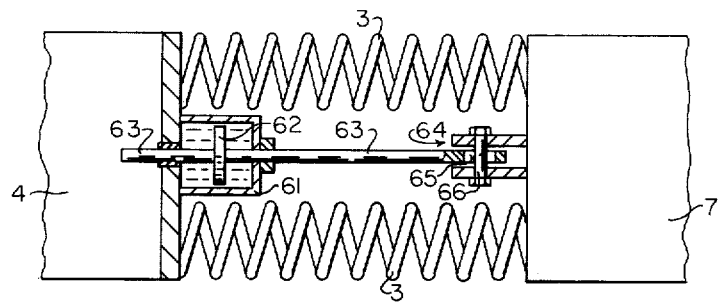
_Fig. VIII_
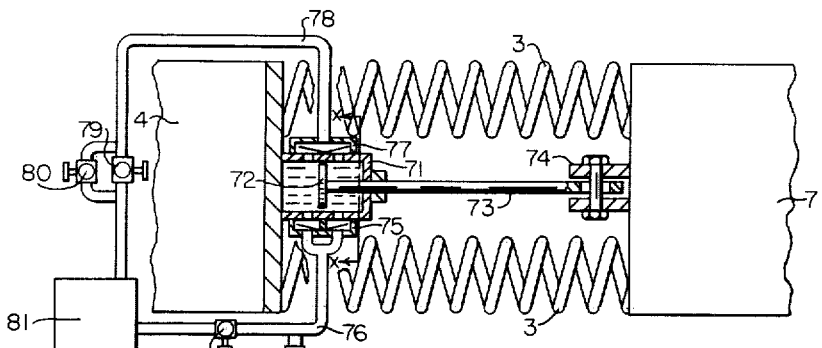
_Fig. IX_
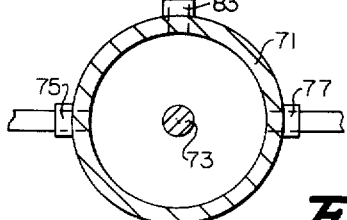
_Fig. X_

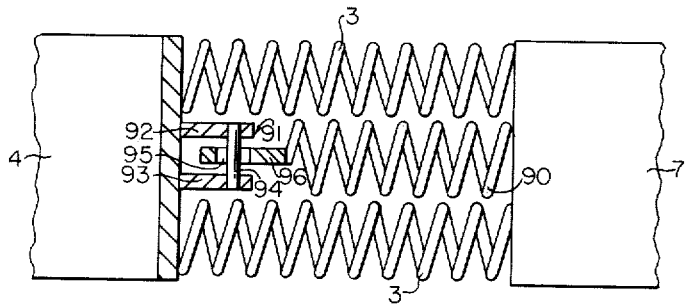
_Fig. XI_
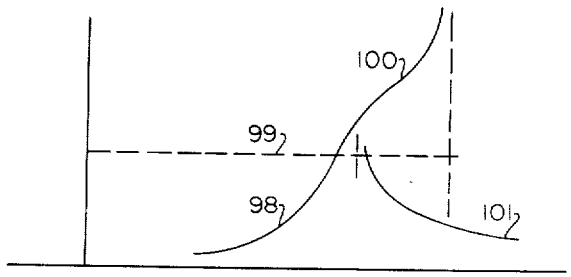
_Fig. XII_
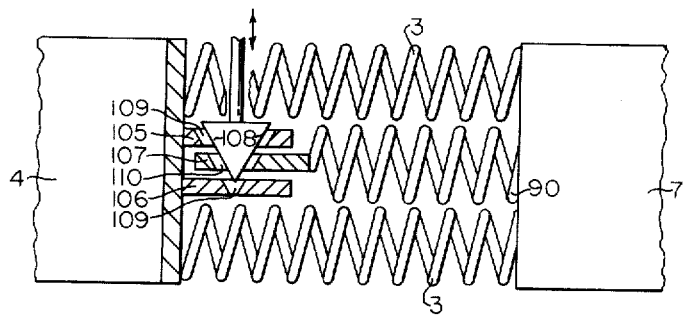
_Fig. XIII_
INVENTOR.
JOHN M. MORRIS
BY
Marshall, Marshall & Yeasting
ATTORNEYS July 2, 1963 J. M. MORRIS 3,095,747
AMPLITUDE CONTROL OF RESONANT VIBRATION EXCITER
Filed July 22, 1957 5 Sheets-Sheet 5
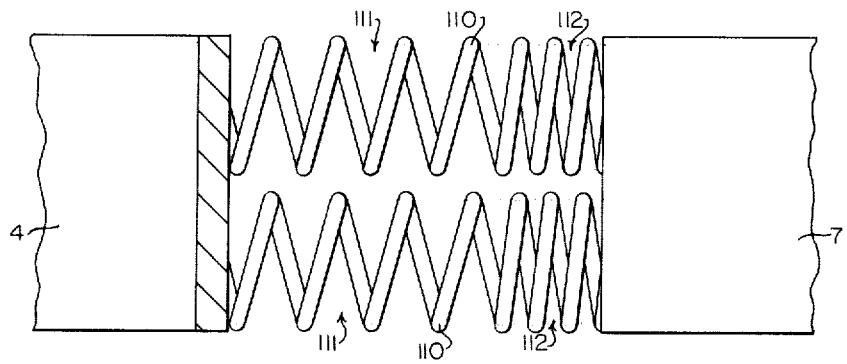
*Fig. XIV*
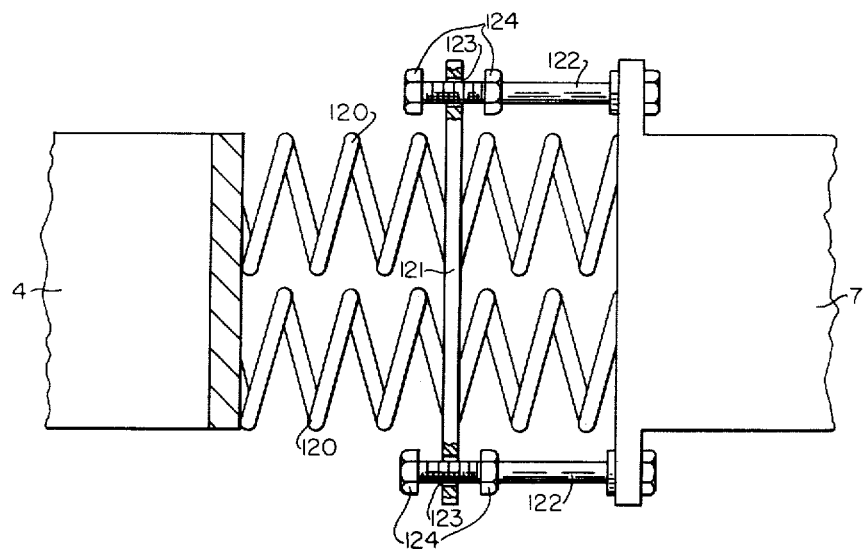
*Fig. XV*
INVENTOR.
JOHN M. MORRIS
BY
*Marshall, Marshall & Yeasting*
ATTORNEYS United States Patent Office 3,095,747
Patented July 2, 1963

3,095,747
AMPLITUDE CONTROL OF RESONANT
VIBRATION EXCITER
John M. Morris, Louisville, Ky., assignor, by mesne assignments, to Chain Belt Company, Milwaukee, Wis., a corporation of Wisconsin
Filed July 22, 1957, Ser. No. 673,416
22 Claims. (Cl. 74—26)

This invention relates to vibration generating equipment and in particular to means for controlling the amplitude of vibration of vibratory systems.

In order to operate efficiently vibratory work performing systems are often driven by means providing a constant force regardless of amplitude. Furthermore the system may be driven at its natural or resonant frequency so that the force required to accelerate and decelerate the work member during each cycle of vibration is supplied by the coupling springs. Such a system, whether of a single or a multiple degree of freedom and whether operated at resonance or not, has the disadvantage that the amplitude of vibration varies greatly with relatively small changes in load or damping. When the systems are small this is not serious, but such changes can be dangerous in large systems where the springs are operated at high stresses.

A vibrating system operated at its natural frequency may be a single degree of freedom system in which the vibrating work member is resiliently coupled to a stationary base or it may be multiple degree of freedom system in which two or more members, one of which is a work member, are resiliently coupled to form a vibratory system and the whole system is resiliently supported from a frame or base. In the latter type of system the work member has a mass from two to ten times the mass of the other member or members.

When the work member to be vibrated is supported on resilient supports the overall system of work member, coupling springs, and impulse member forms a vibratory system having three different modes of vibration occurring at different frequencies. The first mode of vibration is the vibration of the two members and coupling springs as a unit on the resilient support. This occurs at such a low frequency that it is of no practical importance and can be observed only if one is watching for it very carefully and brings the operating speed of the eccentric weight through this frequency range at a very slow rate. The next mode of vibration that is of interest occurs when the eccentric weight operates at such phase with respect to the vibration of the work member that the forces transmitted to the impulse member by the eccentric weight and coupling spring are equal and opposite. This is the type of operation disclosed in U.S. Patent No. 2,636,719 to John C. O'Connor. A third mode of vibration occurs at a higher frequency when the impulse member and the work member are vibrating 180° out of phase and substantially at the resonant frequency of the system comprising the two masses and the coupling spring. When the system is operating in this third mode of vibration at the resonant frequency small changes in damping, i.e., energy loss from the system, result in comparatively large changes in amplitude of vibration of the vibratory system. Furthermore, any system must be designed so that the maximum input forces cannot drive the system to such amplitudes of vibration as to cause premature failure of the various components in the system.

The principal object of this invention is to provide vibration generating equipment of the resonant type in which the amplitude of vibration may be easily controlled without changing the speed of the driving motor.

Another object of the invention is to provide a vibration generating equipment that operates with low loss up to certain predetermined amplitudes of vibration and subjected to high energy loss at larger amplitudes for controlling the amplitude of vibration.

A still further object of the invention is to provide energy dissipating devices in the vibratory system to extract energy when the amplitudes of vibration exceed predetermined limits.

Another object of the invention is to provide coupling spring means the effective rate of which increases when certain amplitudes of vibration are reached so as to alter the resonant frequency of the system and thereby limit the resonant amplitude of vibration.

Another object of the invention is to provide means for varying the effective rate of the supplementary spring means so as to adjustably control the amplitude of vibration while the system is in operation.

Other objects and advantages are apparent from the following description of preferred forms of the invention.

According to the invention supplementary force transmission means are provided between the impulse member or support member and the work member of a resonant vibration exciter and such supplementary means are conditioned to oppose relative movement between the members in directions away from the quiescent or rest positions. In some instances the supplementary means may oppose motion of the members in either direction while in other instances the supplementary means oppose only motion in a first direction or when the amplitude exceeds predetermined limits.

Various forms of the invention are illustrated in the accompanying drawings.

In the drawings:

FIGURE I is a simplified perspective view of a vibratory conveyor constructed according to the invention.

FIGURE II is a fragmentary vertical section taken substantially along the line II—II of FIGURE I.

FIGURE III is a graph showing the relative amplitude versus frequency response for the vibratory system under two conditions of adjustment.

FIGURE IV is a greatly enlarged fragmentary view of the friction brake means of FIGURE II.

FIGURE V is a fragmentary view taken substantially along the line II—II of FIGURE I showing a modified form of amplitude control.

FIGURE VI is a graph showing the relation of amplitude and frequency for the system shown in FIGURE V.

FIGURE VII is a fragmentary plan view of another form of amplitude control mechanism.

FIGURE VIII is a similar view showing another form of amplitude control.

FIGURE IX is a generally schematic fragmentary view showing still another form of amplitude control.

FIGURE X is a fragmentary elevation taken substantially along the line X—X of FIGURE IX.

FIGURE XI is a fragmentary plan view showing another form of amplitude control.

FIGURE XII is a graph showing the relation of amplitude and frequencies for the system shown in FIGURE XI.

FIGURE XIII is a fragmentary plan view of still another form of amplitude controlling mechanism.

FIGURE XIV is a fragmentary plan view of the coupling spring showing still another form of spring suitable for amplitude control of the resonant vibratory system.

FIGURE XV is a fragmentary plan view of a modified form of coupling spring system that changes spring rate with amplitude of vibration.

These specific figures and the accompanying description are intended merely to illustrate the invention and not to impose limitations upon the claims.

In a preferred form of the invention, as illustrated in FIGURE I, a conveyor 1 is hung on resilient cables 2 so that it is free to vibrate without transmitting substantial vibratory force to the framework or structure from which it is supported. Vibratory force is applied to the conveyor 1 through heavy coupling springs 3 that are attached to a spring support 4 on the underside of the conveyor 1 and to an impulse member 5 that is guidingly supported from the conveyor 1 by a plurality of laterally resilient struts 6 similar to guided cantilever beams. The impulse member 5 may be provided with a spring support 7 to provide a firm mounting for the impulse member ends of the coupling springs 3.

The system is put into vibration by rotation of a shaft 10 carrying an eccentric weight 11 and driven by power transmitted through a belt 12 and pulley 13.

In this system the mass of the impulse member 5 is preferably made approximately one fourth the mass of the conveyor 1 and very little damping is applied for small amplitudes of relative vibration or relative movement between the impulse member 5 and the conveyor 1. Preferably the shaft 10 is rotated at a speed that corresponds to or is slightly less than the resonant frequency of the system comprising the conveyor 1, coupling springs 3 and impulse member 5. This is the third mode of vibration mentioned above. The amplitude of vibration that can be generated in this manner at this resonant condition depends upon the power available for driving the shaft 10 and the energy absorbed by the conveyor 1. The resonant or natural frequency of the system does not vary greatly with changes in mass of the conveyor or changes in loading on the conveyor because the ratio of masses is such that the conveyor 1 approximates a rigid support insofar as spring reaction forces on the coupling springs are concerned.

As long as the power input into such a vibratory system is limited the inherent damping forces in the system are sufficient to limit the maximum amplitude of vibration to safe values. However, in larger pieces of equipment, where the amplitudes of vibration are fairly large and the structure is operated near its ultimate strength, additional safe guards must be provided to prevent the amplitude of vibration from exceeding the safe operating limits when the load is removed or there is a loss of damping in the load. This condition occurs when the conveyor runs empty. To take care of this condition additional damping means are provided which may take the form of snubbers, coulomb or sliding friction brakes, viscous friction brakes, or resilient members that are engaged during a portion only of each cycle for altering the resonant frequency and thus limiting the maximum amplitude of vibration.

A simple method of control, illustrated in FIGURE II, includes, in the space between the coupling springs 3, a bar 15 that is rigidly attached to the spring seat 7 and slidingly engages a pair of brake shoes 16 attached to the spring seat 4 and forming with bar 15 a simple form of snubber. The brake shoes 16 and the adjacent end of the bar 15 may be faced with brake lining material or similar wear resisting material. Since the coefficient of friction in a brake is more or less independent of the amplitude or velocity of the relative movement of the members such a brake extracts energy at a rate proportional to the amplitude of vibration. This can be adjusted so that the amount of energy withdrawn from the system at normal amplitudes of vibration is not a serious or major portion of the energy input but so that the energy withdrawn through the friction brake exceeds the energy input before a dangerous amplitude of vibration is reached.

This system may be made more flexible by varying the braking effort by an external control. Such an arrangement is illustrated in FIGURE IV in which the end of the bar 15 is engaged between a stationary brake shoe 20 mounted on the spring support 4 and a movable brake shoe 21 hingedly mounted from the spring seat 4. A hydraulic cylinder 22 similar to the brake cylinder of an ordinary automotive hydraulic brake is mounted on a backing member 23 so that when hydraulic pressure is applied through a connecting line 24 a piston 25 of the hydraulic cylinder 22 forces the brake shoe 21 into gripping engagement with the brake bar 15. In this structure the braking effort varies as the hydraulic pressure and the pressure can be adjusted for any amount of damping that may be desired.

The effect of the brake on the operating characteristics of the resonant system is illustrated in FIGURE III. As shown in this figure the amplitude of vibration of the impulse member 5 is plotted against the operating speed or frequency of the shaft 10. With no damping or no braking effort applied the amplitude of vibration increases quite rapidly as the resonant frequency of the system is approached. If the power input to the system is sufficient and there is sufficient damping to limit the amplitude at resonance the operating speed may go above the resonant frequency in which case the amplitude falls off quite rapidly as indicated by a second branch 31 of the curve. The system is ordinarily designed to operate at a frequency slightly less than or below the resonant frequency and in some cases the operating speed is made adjustable to control the amplitude of vibration. When braking is applied the energy loss prevents a build up of vibrational amplitude at resonance and the amplitude versus frequency relation, instead of following the undamped resonance curve 30, 31, follows another curve such as a critically damped curve 32. In this case the damping or braking effort extracts sufficient energy from the system to prevent a storage of energy and corresponding large amplitude of movement of the impulse member 5 and conveyor 1.

In some cases it may be undesirable to extract any energy by means of the braking structure unless the amplitude exceeds the predetermined amount. FIGURE V illustrates a structure designed to apply braking effort only in the event the amplitude becomes larger than the predetermined magnitude. As shown in this figure a brake bar 35 carries brake lining materials 36 on its end in position to cooperate with brake shoes 37 and 38. As before, a hydraulic cylinder 39 fed through a line 40 is arranged so that its piston 41 may force the brake shoe 38 into engagement with the brake bar 35. This part of the structure is similar to that shown in FIGURE IV. The other end of the brake bar 35 instead of being rigidly attached to the spring seat 7 is connected through a lost motion connection comprising a slot 42 in the end of the brake bar 35 that fits over a coupling pin 43 mounted in a U-bracket 44 attached to the spring support 7. The clearance between the ends of the slot 42 and the pin 43 is such that for normal amplitudes or working amplitudes of vibration the pin does not engage the ends of the slot and hence the bar 35 moves with the spring seat 4 carrying the brake shoes 37 and 38. However, if the amplitude of vibration tends to exceed the clearance in the lost motion connection energy is extracted from the system depending upon the setting of the brake and such energy extraction prevents any material further increase in amplitude of vibration. The amplitude versus frequency characteristic of this system is shown in FIGURE VI in which the amplitude of movement between the impulse member 5 and the conveyor 1 is plotted against frequency of operation. A first curve 45, indicating the relation between amplitude and frequency below the resonant frequency, shows a gradually increasing amplitude as the natural frequency of the system is approached with the amplitude tending to go to infinity at the resonant frequency. If the system is operated at a higher frequency the amplitude versus frequency follows a second branch 46 of the curve which shows a rapidly decreasing amplitude of vibration that finally levels off at a substantially constant amplitude that corresponds to the weight and eccentricity of the eccentric weight 11.

When the brake shoes 37 and 38 are engaged with the brake bar 35 and the amplitude is such that the clearance in the lost motion connection is not completely taken up the amplitude versus frequency follows the curve 45 up until a limit indicated by a line 47 is reached. At this point clearance in the lost motion connection is taken up at the end of each stroke and any further increase in amplitude resulting from increased driving force merely causes sliding of the brake and energy extraction so that the actual amplitude of vibration, even with no other damping, follows a curve 48 from the branch 45 across to the branch 46. Thus the maximum amplitude of vibration that can be obtained is only slightly greater than the amplitude allowed by the lost motion connection.

Viscous or hydraulic friction may be used instead of the static or coulomb friction of the friction brake if a smoother control is required. Various arrangements of hydaulic damping devices are illustrated in FIGURES VII, VIII, IX and X, the example shown in FIGURE VII comprising a shock absorber or dashpot 51 attached to the spring support 4 and having its plunger or piston 52 connected through a plunger rod 53 to the spring seat 7. Packing glands 54 prevent leakage of fluid around the plunger rod 53. Hydraulic fluid 55 contained within the dashpot 51 supplies the damping force as it is forced from one side to the other of the piston 52 as the spring seats 4 and 7 move relative to each other. The amount of damping is determined by the clearance between the wall of the dashpot 51 and the edges of the piston 52 supplemented by holes through the piston if less damping is required. The closer this clearance the greater the damping effect that is provided by the dashpot.

The characteristics of this type of control may be varied over wide limits by varying the quantity of liquid contained within the dashpot. Thus, as shown, air spaces 56 and 57 above the level of the hydraulic fluid provide a certain amount of elasticity in each of the chambers of the dashpot 51 so that the dashpot acts as a combination air spring and dashpot. If in this type of design there is too much leakage of air from one chamber to the other the piston 52 may be made to closely fit the walls of the dashpot 51 and orifices 58 provided through the piston 52 in the areas that are completely immersed in liquid at all times. In FIGURE VII, to illustrate the air space chambers 56 and 57, the dashpot 51 has been shown as if were in vertical elevation whereas the figure is in general a plan view.

In this arrangement the damping provided by the dashpot 51 varies generally as the square of the velocity of the piston 52 relative to the dashpot body 51. Since at constant frequency the velocity varies directly as the amplitude this type of damping is increasingly effective at the higher amplitudes. Thus for small amplitudes of motion there is a small amount of damping present and the system operates at high efficiency. As the amplitude tends to increase beyond the designed limits the damping effect of the hydraulic fluid becomes increasingly effective and limits the maximum amplitude that can be obtained for a given amount of driving effort.

The hydraulic damping structure may also be varied by including a lost motion connection as was done in the preceding examples showing friction brakes. Thus in FIGURE VIII the spring seats 4 and 7 which are joined by the coupling springs 3 are also connected through a dashpot 61 mounted on the spring support 4 with its plunger or piston 62 connected through a piston rod 63 and a lost motion connection 64 to the other spring support 7. The clearance in the lost motion connection 64 which is the excess in length of the slot 65 in the plunger rod 63 over the diameter of a pin 66 determines the limits of amplitude of relative vibration of the members 4 and 7 before the dashpot becomes effective in retarding the vibration.

In this system the clearance in the lost motion connection 64 is ordinarily adjusted or designed to be equal to the normal working amplitude of vibration so that up to that limit no energy is drained from the system by reason of the dashpot 61. However, any increase in amplitude above such designed limit causes relative motion between the piston 62 and the dashpot body 61 resulting in absorption of energy from the vibrating system.

The hydraulic damping systems shown in FIGURES VII and VIII are designed for certain maximum amplitudes and are not easily adjustable while the machine is in operation. If it is necessary to make adjustments while the machine is in operation the system may be arranged substantially as shown in FIGURES IX and X. In the structures shown in FIGURES IX and X the spring seats 4 and 7 carrying the coupling springs 3 are also connected by means of a short stroke hydraulic pump 71. The pump 71, mounted on the spring support 4, includes a piston 72 connected through a piston rod 73 to the spring support 7. If desired, a lost motion connection 74 may be included. The pump 71 has an inlet valve system 75 connecting a suction line 76 to the chambers of the pump on either side of the piston 72 and a discharge valve system 77 for connecting the pump chambers to an outlet line 78. The outlet line 78 leads through an adjustable flow restricting valve 79 and a pressure relief valve 80, arranged in parallel, to a reservoir 81 arranged to collect the liquid from the pump 71. Liquid flows from the reservoir 81 through a second control valve 82 into the suction line 76.

With this system the damping may be easily adjusted from a small amount to a comparatively large amount by adjustment of the valves 79 and 82. Assuming that the lost motion connection 74 is set for zero clearance or omitted, minimum damping is obtained by closing the valve 82 so that the pump pumps the hydraulic fluid out of the chambers into the output line 78 and operates at no load with substantially a complete vacuum on either side of the piston 72. Under this condition it takes but little force to move the piston back and forth in the chamber of the pump 71. Maximum damping is obtained by opening the valve 82 so that hydraulic liquid is pumped through the pump against the pressure determined by the pressure relief valve 80. Intermediate amounts of damping are obtained by selective control of the discharge line valve 79 and the suction line valve 82. The full range may be covered substantially continuously by starting with the discharge valve 79 open and the suction valve 82 closed to give minimum damping and thence gradually opening the valve 82 permitting fluid to be pumped around the circuit against the pressure drop in the lines and fittings. Additional damping is obtained up to the limit provided by the pressure relief valve 80 by progressive closure of the discharge line valve 79.

If it is desired to incorporate a certain amount of elastic restraint in connection with the damping the pump 71 may be operated with the pumping chambers partially filled with air. To accomplish this type of operation the suction valves and the discharge valve assembly 77 are located at the sides or near the bottom of the cylinder and a further discharge valve assembly 83 (FIGURE X) is mounted on the upper portion of the pump body 71 and provided with a control valve 84 opening to the atmosphere. Also, the suction line 76 is provided with an air valve 85 to allow air to be drawn into the suction line along with the hydraulic liquid. In this arrangement because of the location of the valves around the pump cylinder, the pump may be conditioned to pump liquid or gas as desired by proper operation of the valves 79, 82, 84 and 85. The valves 82 and 79 control the pumping of the liquid while the valves 84 and 85 control the pumping of air through the system. For example if the valve 85 is open to permit air to enter the suction line 76 while the valve 84 is closed the pump will pump air until it reaches an equilibrium condition with air pressure developed in the chambers and in the discharge valve assembly 83. This provides an air spring or air cushioning effect assisting the coupling springs 3 in determining the natural frequency of the system. The effectiveness of the air spring may be reduced by bleeding air from the system through the discharge valve 84 while permitting liquid to be drawn into the pump 82. If this is carried out long enough all of the air will be eliminated from the pumping system and it will operate as an ordinary hydraulic pump or liquid filled dashpot.

In those cases in which the air valves are added to the pump 71 so as to take advantage of the air spring effect the pump should have a very high compression ratio so that a high air pressure may be developed when pumping air or a mixture that is predominantly gaseous.

In each of the foregoing examples the control of the amplitude of vibration of the system is determined by the rate at which energy is drained from the system. Thus the amplitude may be easily controlled by draining any excess energy from the system and thus preventing the storage of energy in the vibrating system at large amplitures of vibration.

When a constant speed motor is used to drive an eccentric weight so that the driving force always has substantially the same frequency of operation the amplitude may be easily controlled by arranging additional resilient members that are active only during a portion of each cycle of vibration to change the effective spring rate and thus the natural frequency of the system as the amplitude changes. Such a system may be designed to operate at a given resonant frequency corresponding to the driving speed of the eccentric for small amplitudes of vibration and to have a higher resonant frequency at larger amplitudes of vibration so that the system never operates in resonance at large amplitudes of vibration. Structure to operate according to this method is illustrated in FIGURES XI, XIII and XIV and an amplitude versus frequency curve is illustrated in the graph of FIGURE XII. This structure comprises the spring supports or spring seats 4 and 7 of the structure shown in FIGURE I, the coupling springs 3 that couple these supports together and form the resilient member of the vibratory system comprising the conveyor 1 and impulse member 5. An additional resilient member in the form of a spring 90 is connected between the spring support 7 and the spring support 4 through a lost motion connection 91 that includes a pair of side members 92 and 93 supporting a pin 94 that extends through a slot 95 in a bar 96 attached to the spring 90.

As long as the amplitude of vibration does not exceed a certain limit defined by the length of the slot 95 the system has a natural or resonant frequency determined by the masses connected to the spring supports 4 and 7 and the rate or stiffness of the coupling springs 3, the amplitude versus frequency in this range of amplitude is substantially as shown by a curve 98 of FIGURE XII. If the amplitude increases while operating at the resonant frequency to an amplitude indicated by a horizontal line or constant amplitude line 99 the clearance in the lost motion connection is taken up near the ends of the stroke and the spring 90 comes into play for a limited period of time during each cycle so as to increase the effective resonant frequency during this interval. If the driving frequency is increased beyond the original frequency of resonance the system operates according to a branch 100 of the curve indicating that, as the frequency rises, the amplitude may also rise because the system then approaches a new natural frequency determined by the combination of the spring 90 with the original coupling springs 3. The overall effective spring rate depends upon the amplitude of vibration which determines the percentage of time that the spring 90 is a working part of the system.

In the usual case the driving force comes from a constant speed motor that fixes the operating frequency and the addition of the spring 90 serves to detune the system as the amplitude increases and thus prevents substantial amplitude increases above a predetermined initial amplitude. This arrangement operates with a high degree of efficiency because there is no energy loss in the system other than the useful work performed by the vibrating conveyor 1.

If the system is driven to a higher frequency as by increasing the speed of the motor over the designed speed limit so as to operate at the increased or higher resonant frequency the amplitude first increases and then as a limit determined by the residual damping is reached the amplitude drops suddenly to a low value. The operating speed at this point is above the resonant frequency for smaller amplitudes and hence the actual amplitude of vibration of the system becomes quite small. As the motor slows down after power is removed, the amplitude will increase as the resonant frequency is approached, then will suddenly transfer from the branch of the curve 101 near the original resonant frequency to the branch 100 and then follow it down toward lower frequencies as the motor slows down.

It is often desirable to be able to adjust the amplitude of vibration or the amplitude limits of vibration while the system is in operation. One method of accomplishing this is illustrated in FIGURE XIII which is similar to FIGURE XI in that it has the spring supports or seats 4 and 7, the coupling springs 3, the auxiliary spring 90 and a lost motion connection. In this figure the lost motion connection is modified to include an adjustable feature. It includes a pair of side plates 105 and 106, a bar 107 attached to the spring 90 located between the plates 105 and 106 and a wedge-shaped pin 108 that may be moved in or out of engagement with a wedged-shaped slot 109 in the members 105 and 106, and slot 110 in the bar 107. If a small clearance is desired the wedge-shaped pin 108 is moved downwardly in the figure so as to decrease the amount of clearance between the pin and the sides of the slots. If a larger amplitude or larger amount of lost motion is desired the pin is partially retracted from such closed position. Thus the relative position of the wedge-shaped pin 108 determines the amount of lost motion and thus the effectiveness of the spring 90 in controlling the frequency of vibration at selected amplitudes of vibration.

In all of the systems employing a lost motion connection it is contemplated that shock absorbing material such as a layer of vulcanized rubber or similar resilient material will be employed in the lost motion connections to minimize the shock of engagement as the parts take up the clearance in each direction of motion.

Instead of employing a separate spring and lost motion connection to change the spring rate when the amplitude of vibration exceeds a certain limit, the main coupling springs may be wound with a section having nearly closed pitch coils which, as the spring is compressed, contact each other thus shortening the effective length of the spring and increasing its rate. Such a system is shown in FIGURE XIV in which the spring seats 4 and 7 are connected by main coupling springs 110 each of which has a first section 111 wound with its coils sufficiently spaced to maintain intercoil clearance at the working amplitude of vibration and a second section 112 wound with closely spaced coils that contact each other whenever the amplitude of vibration exceeds a predetermined amount.

While this arrangement changes the effective spring rate during only a part of the compression part of the vibration cycle it is not as effective as the lost motion connection which works on the peaks of both the tension and compression portions of the vibration cycle. Its simplicity makes it particularly desirable where adjustment of the maximum amplitude is not required.

A similar arrangement adapted to operate on both the tension and compression parts of the cycle of vibration is illustrated in FIG. XV. In this structure the spring seats 4 and 7 are connected by coupling springs 120 each of which is clamped, or otherwise secured, intermediate its ends to a cross bar 121. Stop rods 122 secured in the spring seat 7 extend parallel to the springs 120 and through holes 123 in the ends of the cross bar 121. Stop nuts 124 threaded onto the stop rods 122 and locked in adjusted position limit the movement of the cross bar 121.

This arrangement functions similarly to that shown in FIGURE XI in that the effective spring rate increases when the amplitude exceeds a given limit. This follows because of the effective shortening of the active length of the springs when the cross bar meets the stops. In this structure the velocity of the crossbar 121 as it strikes the stop nuts 124 is less than the velocity at engagement in the lost motion connection previously described but the forces after engagement are greater. On the basis of noise and wear the slower engagement is preferable.

While the auxiliary springs in the several embodiments have been illustrated as coil springs it should be understood that other forms of springs are equally useful. Furthermore, in those forms of the invention employing change in spring rate to control the amplitude elastic materials such as rubber may be used. This is particularly true in those examples where the supplementary springs are effective during only a portion of each cycle of vibration. Ordinarily rubber is not satisfactory for the coupling springs because changes in load on the conveyor vary the compression and thus the rate of the springs. The supplementary springs are not subjected to this loading and therefore may be made of rubber or other non-linear spring material.

The various examples of amplitude control were illustrated as applied to a multiple degree of freedom system that comprises the work member, exciter member and coupling spring. This is for illustration only since the same controls are equally effective for controlling the amplitude of a single degree of freedom system. In the single degree system the support member takes the place of the exciter member except that it has a much larger mass or is otherwise restrained from vibrating. The vibrating system thus comprises the work member, the support member and the coupling springs connecting the members to form the resonant vibratory system and the amplitude control members act in parallel with the coupling springs between the two members.

In each of the various embodiments of the invention the structure added to the basic vibratory system comprising the conveyor 1, impulse member 5 (or support member), and coupling springs 3 acts to oppose any relative motion of the parts from their position at rest. In some cases the opposition is by friction or viscous damping force while in other cases the resistance is offered by the resiliency of the springs either the metallic springs or the air springs. Each of the various types may be arranged to extract energy to control the amplitude of vibration above certain amplitude limits without affecting the operation of the system at smaller amplitudes.

Various modifications may be made in the various details of construction without departing from the scope of the invention.

Having described the invention, I claim:

1. In a device of the class described, in combination, a first member that does work by vibration, an exciter member, spring means connecting said members and forming with said members a vibratory system having a natural frequency, an eccentric weight journaled in the exciter member, means to rotate said weight at a speed substantially equal to said natural frequency, supplementary springs connected to one of said members, and lost motion means connecting said supplementary springs to the other of said members.

2. In a device according to claim 1, means for adjusting the lost motion means.

3. In a device for doing work by vibration, a first member that does work by vibration, a support member, spring means connecting the first member to the support member and forming with the first member a vibratory system having a natural frequency, a rotating eccentric weight journaled in the first member for applying vibratory force to said first member at a frequency substantially equal to said natural frequency, supplementary spring means connected to one of said members, and lost motion means connecting the supplementary spring means to the other of said members.

4. In a device according to claim 3, means for adjusting the lost motion device.

5. In a device for doing work by vibration, in combination, a first member that does work by vibration, a second member, spring means connecting said members and forming with the members a vibratory system having a natural frequency, means for applying a vibratory force of constant magnitude to one of the members at a constant frequency generally equal to said natural frequency, means for varying the effective rate of said spring means according to the magnitude of the relative movement between said members, whereby the natural frequency of the vibratory system departs from said constant frequency as the amplitude of relative movement increases.

6. In a device for doing work by vibration, in combination, a first member that does work by vibration, a second member, resilient means including a variable rate spring connecting said members and forming with the members a vibratory system having a natural frequency that increases with increases in amplitude of relative motion of the members, and means for applying a vibratory force of generally constant magnitude to said members at a constant frequency substantially equal to said natural frequency for small amplitudes of vibration.

7. In a device for doing work by vibration, in combination, a first member that does work by vibration, a second member, spring means connecting the members and forming with the members a vibratory system, said spring means having a first effective spring rate for small amplitudes of relative displacement of the members and a larger spring rate for larger displacements of the members whereby the vibratory system has a first natural frequency for small amplitudes and a higher natural frequency for larger amplitudes, an eccentric weight journaled in the second member, and means for rotating the weight at a constant speed generally equal to said first natural frequency.

8. In a device for doing work by vibration, in combination, a resiliently supported first member that does work by vibration, a second member that is free to vibrate, spring means operatively connecting said members and forming with the members a vibratory system having a natural frequency, rotating eccentric weight means journaled in the second member for applying vibratory force to the second member at a fixed frequency substantially equal to said natural frequency, and means interconnecting said members for limiting the storage of vibratory energy in said vibratory system when operating at said fixed frequency.

9. In a device for doing work by vibration, in combination, a resiliently supported first member that does work by vibration, an exciter member, means supporting the exciter member including spring means connected between said members and forming with said members a vibratory system having a natural frequency, eccentric weight means journaled in the exciter member for applying vibratory force to the exciter member at a frequency substantially equal to said natural frequency, and yielding means connected between said members for yieldingly opposing relative motion between said members.

10. A device according to claim 9 in which the yielding means are effective over less than a complete cycle of relative movement of the members.

11. A device according to claim 9 in which the yielding means comprises a friction brake.

12. A device according to claim 11 having means for adjusting the friction brake while the device is in operation.

13. A device according to claim 11 having means for connecting the friction brake only when the amplitude of relative movement of the members exceeds a predetermined amplitude.

14. A device according to claim 9 in which the yielding means comprise hydraulic means yieldingly opposing relative movement of the members.

15. A device according to claim 14 including lost motion means for effectively connecting the hydraulic means when the amplitude exceeds a predetermined amplitude.

16. A device according to claim 14 including valved conduits in the hydraulic means for varying the opposition to relative movement of the members provided by the hydraulic means.

17. A device according to claim 9 in which the yielding means comprises hydropneumatic means connected between the members for yieldably opposing relative motion of the members.

18. A device according to claim 17 including means for adjusting the hydropneumatic means while the device is in operation.

19. A device according to claim 14 in which the hydraulic means comprises a pump having a piston connected to one member and a cylinder attached to the other member and means for supplying fluid to the pump and receiving fluid from the pump.

20. A device according to claim 19 having valves connected to the pump for controlling the flow of fluid through the pump.

21. A device according to claim 20 having controlled means for admitting air to the pump.

22. A device according to claim 19 having a lost motion connection between the pump and one of said members.

References Cited in the file of this patent

UNITED STATES PATENTS

| | | |
|---|---|---|
| 1,022,332 | Roth | Apr. 2, 1912 |
| 1,146,947 | Norton | July 15, 1915 |
| 1,737,772 | Schieferstein | Dec. 3, 1929 |
| 1,769,413 | Binte et al. | July 1, 1930 |
| 1,774,769 | Spear | Sept. 2, 1930 |
| 2,144,382 | Lincoln et al. | Jan. 17, 1939 |
| 2,358,876 | Overstrom | Sept. 26, 1944 |
| 2,421,267 | Huber | May 27, 1947 |
| 2,636,719 | O'Connor | Apr. 28, 1953 |
| 2,647,591 | Young | Aug. 4, 1953 |
| 2,743,706 | Veenschoten | May 1, 1956 |

FOREIGN PATENTS

| | | |
|---|---|---|
| 887,443 | Germany | Aug. 24, 1953 |

UNITED STATES PATENT OFFICE
CERTIFICATE OF CORRECTION

Patent No. 3,095,747                                          July 2, 1963

John M. Morris

It is hereby certified that error appears in the above numbered patent requiring correction and that the said Letters Patent should read as corrected below.

In the grant (only), line 1, for "John M. Mooris" read -- John M. Morris --; column 1, line 23, for "dumping" read -- damping --; column 5, line 44, after "if" insert -- it --; column 7, lines 19 and 20, for "amplitures" read -- amplitudes --.

Signed and sealed this 14th day of April 1964.

(SEAL)

Attest:
ERNEST W. SWIDER                                             EDWARD J. BRENNER Attesting Officer                                                Commissioner of Patents